(12) United States Patent
Kuipers et al.

(10) Patent No.: US 12,375,126 B2
(45) Date of Patent: Jul. 29, 2025

(54) COORDINATION OF DPUs IN A CROSSTALK ENVIRONMENT

(71) Applicant: ADTRAN GmbH, Berlin (DE)

(72) Inventors: Martin Kuipers, Dallgow-Doeberitz (DE); Fred Tze-Yu Chu, Madison, AL (US)

(73) Assignee: Adtran GmbH, Berlin (DE)

( * ) Notice: Subject to any disclaimer, the term of this patent is extended or adjusted under 35 U.S.C. 154(b) by 258 days.

(21) Appl. No.: 17/756,967

(22) PCT Filed: Dec. 19, 2019

(86) PCT No.: PCT/EP2019/086414
§ 371 (c)(1),
(2) Date: Jun. 7, 2022

(87) PCT Pub. No.: WO2020/053452
PCT Pub. Date: Mar. 19, 2020

(65) Prior Publication Data
US 2023/0008963 A1    Jan. 12, 2023

(51) Int. Cl.
*H04B 3/32* (2006.01)
*H04L 47/70* (2022.01)
*H04M 11/06* (2006.01)

(52) U.S. Cl.
CPC .............. *H04B 3/32* (2013.01); *H04L 47/82* (2013.01); *H04M 11/062* (2013.01)

(58) Field of Classification Search
CPC ......... H04B 3/32; H04L 47/82; H04M 11/062
See application file for complete search history.

(56) References Cited

U.S. PATENT DOCUMENTS

| 9,912,376 B2 | 3/2018 | Kuipers et al. | |
|---|---|---|---|
| 2014/0056312 A1* | 2/2014 | Strobel | H04J 3/0682 370/503 |
| 2018/0041246 A1* | 2/2018 | Strobel | H04B 3/487 |
| 2018/0219640 A1* | 8/2018 | Kerpez | H04B 3/32 |

OTHER PUBLICATIONS

International Preliminary Report on Patentability in International Appln. No. PCT/EP2019/086414, mailed on May 17, 2022, 8 pages.
International Search Report and Written Opinion in International Appln. No. PCT/EP2019/086414, mailed on May 13, 2020, 10 pages.
itu.int [online], "Series G: Transmission Systems and Media, Digital Systems and Networks," Mar. 2019, retrieved on Oct. 7, 2022, retrieved from URL <https://www.itu.int/rec/T-REC-G.9701-201903-I/en>, 516 pages.

* cited by examiner

*Primary Examiner* — Rahel Guarino
(74) *Attorney, Agent, or Firm* — Fish & Richardson P.C.

(57) ABSTRACT

A centralized dynamic resource allocation is suggested to adjust a resource allocation for at least two DPUs. Also, a method for adjusting a resource allocation for the at least two DPUs by a centralized dynamic resource allocation entity is provided. Further, a system comprising at least one such device is proposed.

19 Claims, 11 Drawing Sheets

COORDINATION OF DPUs IN A CROSSTALK ENVIRONMENT

CROSS REFERENCE TO RELATED APPLICATIONS

This application is a National Phase application under 35 U.S.C. § 371 of PCT International Application number PCT/EP2019/086414, filed Dec. 19, 2019. The entire contents of this application is hereby incorporated by reference.

Distribution Point Units (DPU) usually operate in a crosstalk environment in which vectoring resources are limited.

Telecommunication environments experience crosstalk as a primary impairment to the capacity and stability, e.g., in a digital subscriber line (DSL) system. Crosstalk refers to the electromagnetic coupling between neighboring wires used by the DSL transmission.

Vectoring is a technology used in DSL systems to actively cancel crosstalk among a predefined numbers of lines, which is also referred to as a vectoring group. The lines outside of this vectoring group are considered "alien" and may produce crosstalk with a detrimental impact on data rate (capacity) and stability (error or retraining) of the lines inside the vectoring group.

In order to achieve high capacity and stability, all cable pairs may have to be vectored in a single vectoring group. This, however, is very complex as the number of high-speed connections between DPUs and vectoring resources (e.g., signal processors, memories, etc.) scale with k square, k being the number of lines in the vectoring group. Hence, the overall complexity can be significantly reduced by segmenting the large vectoring problem to several (smaller) vectoring groups.

U.S. Pat. No. 9,912,376 B2 discusses the feature of managing crosstalk in multiple vectoring groups within a DPU.

The objective is to improve existing solutions and in particular reduce crosstalk between lines (cable pairs).

This problem is solved according to the features of the independent claims. Further embodiments result from the depending claims.

The examples suggested herein may in particular be based on at least one of the following solutions. In particular combinations of the following features could be utilized in order to reach a desired result. The features of the method could be combined with any feature(s) of the device, apparatus or system or vice versa.

In order to overcome this problem, a dynamic resource allocation entity (e.g., device) is suggested that is arranged to adjust a resource allocation for at least two DPUs.

According to an embodiment, the device is arranged externally to the at least two DPUs, in particular in a higher order node and/or a cloud.

According to an embodiment, the resource allocation for the at least two DPUs comprises at least one of the following:
  an upstream resource allocation within at least one DOI for each of the DPUs;
  a downstream resource allocation within at least one DOI for each of the DPUs.

According to an embodiment, the resource allocation for the at least two DPUs is adjusted such that an overlap of time slots used by different DPUs in the time domain for conveying traffic is reduced or minimized.

According to an embodiment, each of the DPUs is assigned a different non-overlapping portion of at least one DOI.

According to an embodiment, a ratio between at least one NOI and at least one DOI per upstream and/or downstream is adjusted within at least one TDD frame.

According to an embodiment, the duration of the at least one NOI in the TDD frame is reduced or minimized.

According to an embodiment, a power spectral density (PSD) of the at least one NOI portion is reduced by utilizing dynamic spectrum management (DSM).

According to an embodiment, the ratio between at least one NOI and at least one DOI per upstream and/or downstream is set by the device for each DPU.

According to an embodiment, the timing of the DPUs is synchronized via a higher order node.

The timing of the DPUs is synchronized to mitigate or avoid NEXT.

According to an embodiment, the timing of the DPUs is synchronized via a master node, wherein the master node is one of the DPUs.

According to an embodiment, the timing of the DPUs is synchronized via global positioning system (GPS) signal.

According to an embodiment, the device is arranged to synchronize the timing of the DPUs.

Also, a system is provided comprising the device as described herein and at least one DPU, wherein the at least one DPU is connected via a at least one cable bundle to several terminals, e.g., CPEs.

Further, a method is suggested for operating at least two DPUs, the method comprising:
  adjusting a resource allocation for the at least two DPUs by a centralized dynamic resource allocation entity.

According to an embodiment, the resource allocation for the at least two DPUs comprises at least one of the following:
  an upstream resource allocation within at least one DOI for each of the DPUs;
  a downstream resource allocation within at least one DOI for each of the DPUs.

According to an embodiment, the resource allocation for the at least two DPUs is adjusted such that an overlap of time slots used by different DPUs in the time domain for conveying traffic is reduced or minimized.

According to an embodiment, each of the DPUs is assigned a different non-overlapping portion of at least one DOI.

According to an embodiment, traffic is prioritized before being conveyed across the different non-overlapping portions of the at least one DOI.

According to an embodiment, a ratio between at least one NOI and at least one DOI per upstream and/or downstream is adjusted within at least one TDD frame.

According to an embodiment, the timing of the DPUs is synchronized via at least one of the following:
  a higher order node;
  the centralized dynamic resource allocation entity;
  one of the DPUs.

Further, a computer program product is suggested, which is directly loadable into a memory of a digital processing device, comprising software code portions for performing the steps of the method as described herein.

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

Examples described herein in particular enable utilizing several DPUs and reducing crosstalk between lines of these DPUs. This may in particular be achieved by improving a time slot utilization across the DPUs to allow higher peak rates for each transmission direction regarding user data traffic exchanged between the terminals (CPEs) and the DPUs.

Also, the DPUs are synchronized to a common clock signal, which may be provided via a data backhaul interface such as xPON or Synchronized Ethernet or by other means as described below.

A central entity is suggested to coordinate the vectoring and/or synchronization across the multitude of DPUs. This central entity may provide a centralized function, which can be embedded or virtualized in an existing entity, e.g., a Higher Order Node (HON) or a master node. The centralized function may also be provided by a separate physical entity. Further, the centralized function may be distributed across at least two physical entities.

The central entity may in particular provide a Dynamic Resource Allocation (DRA) function. The vectoring and/or synchronization may be coordinated via a backhaul interface such as xPON or SyncE according to IEEE 1588.

Coordinated Dynamic Time Assignment (cDTA) along with localized vectoring may achieve high peak rates for a high pair count cable with multiple DPUs without the need for high complexity system level vectoring.

In a typical telecommunication wiring pit or wiring closet, there could be a large number of twisted pairs with only a fraction of these pairs being utilized for the high-speed digital subscriber line (DSL) services. For example, a number of low port count (4 or 8) G.fast DPUs may be deployed in a pay-as-you-go manner, because an initial take rate of customers may be too low to justify installing a large(er) port count (24 or 48) DPU due to cost and powering requirements.

For example, operators may choose deploying a low port count DPU without having to invest in a system-level vectoring system (that would be required to achieve full vectoring) as long as the number of active subscribers of a multi-dwelling unit (MDU) or Garden Style Apartment is low. Since most of these pits and wiring closets share the same cable sheath for the distribution of twisted pairs into each living unit (LU) without meaningful cable-binder separation, DSL service data rates and stability may degrade as soon as two or more of these independently vectored DPUs are installed without any additional inter DPU coordination. The reason for this is based on two major impairments, i.e. inter DPU NEXT and inter DPU FEXT.

These and further details are hereinafter exemplarily explained with regard to the G.fast time-domain duplexing (TDD) framing structure.

Figure 1:
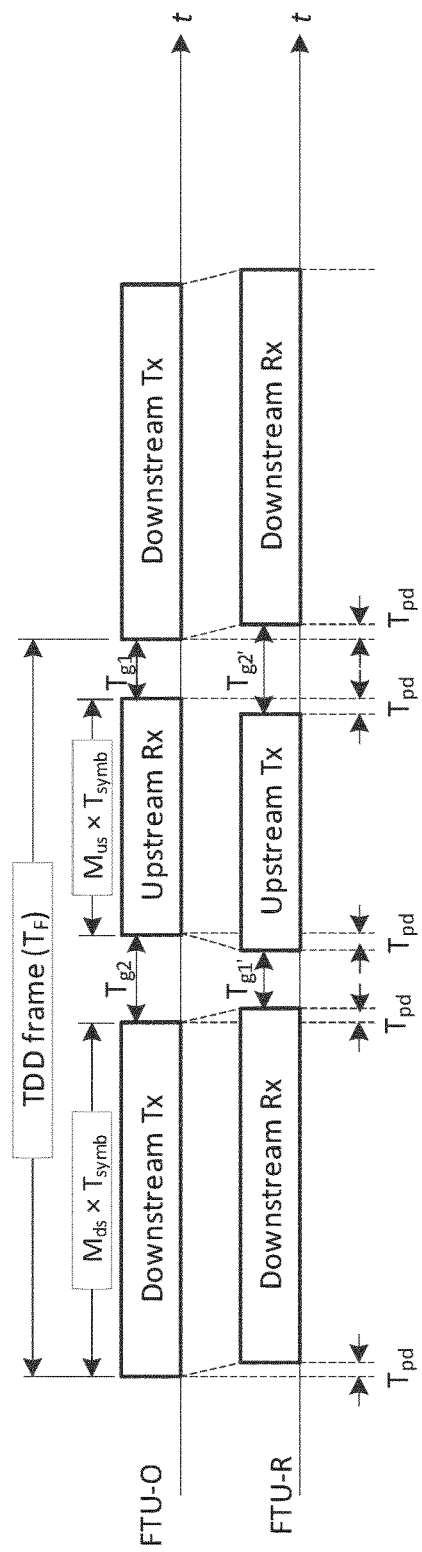
FIG. 1 shows a G.fast TDD frame with alternating downstream and upstream sections for an FTU-O and an FTU-R.

FIG. 1 shows a G.fast TDD frame with alternating downstream and upstream sections for an FTU-O and an FTU-R. This is basically disclosed in Fig. 10.26 of https://www.itu.int/rec/T-REC-G.9701-201903-I/en.

A TDD frame comprises a number $M_{ds}$ of downstream symbols and a number $M_{us}$ of upstream symbols. $T_{symb}$ indicates a duration of a single symbol. A first portion of the TDD frame is dedicated to the downstream transmission and a second portion of the TDD frame is dedicated to the upstream transmission.

It is noted that the allocation of a time slot corresponds to a symbol. Hence, the term symbol may be used to also indicate a (single) time slot.

Figure 2:
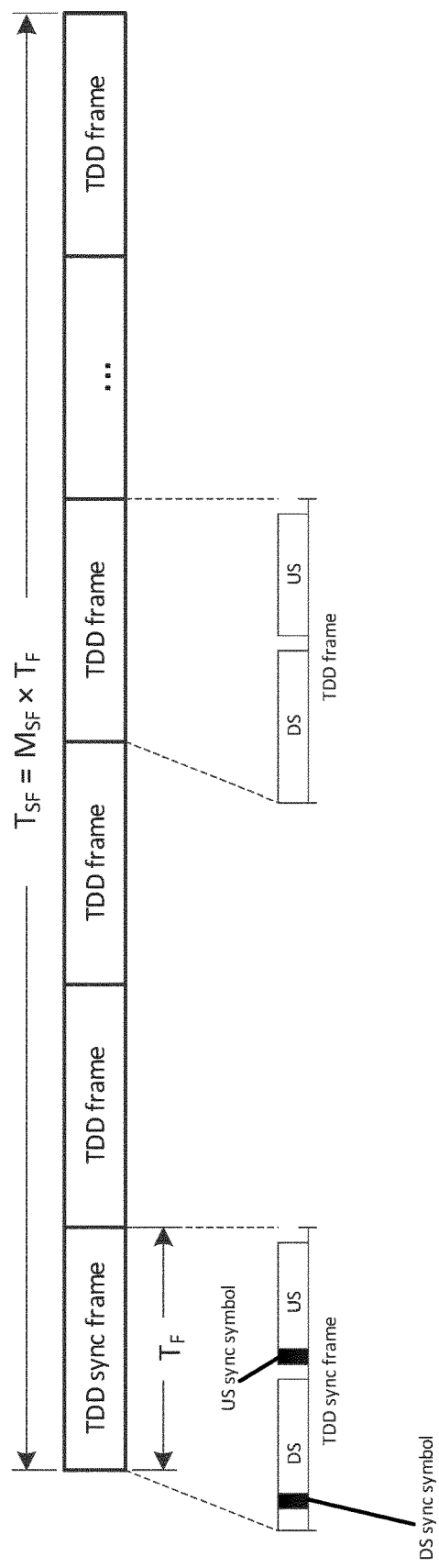
FIG. 2 shows a G.fast superframe structure comprising several TDD frames.

FIG. 2 shows a G.fast superframe structure indicated by a duration $T_{SF}$. This picture is also basically disclosed in Fig. 10-28 of https://www.itu.int/rec/T-REC-G.9701-201903-I/en.

The superframe comprises multiple TDD frames. The duration $T_{SF}$ of the superframe may be in the order of 6 ms. In an exemplary G.fast setting, the TDD frame comprises $M_F$=36 symbols, the superframe comprises $M_{SF}$=8 TDD frames. Hence, the superframe comprises 288 symbols and each TDD frame lasts for about 6 ms/8=0.75 ms.

The first TDD frame within the superframe is referred to as TDD sync frame. It contains downstream and upstream sync symbols and carries a probe sequence during initialization and showtime for far-end crosstalk estimation.

The downstream sync symbol is transmitted immediately before an RMC (Robust Management Channel) symbol position and the upstream sync symbol is transmitted in the first symbol position of the upstream part of the TDD frame.

Figure 3:
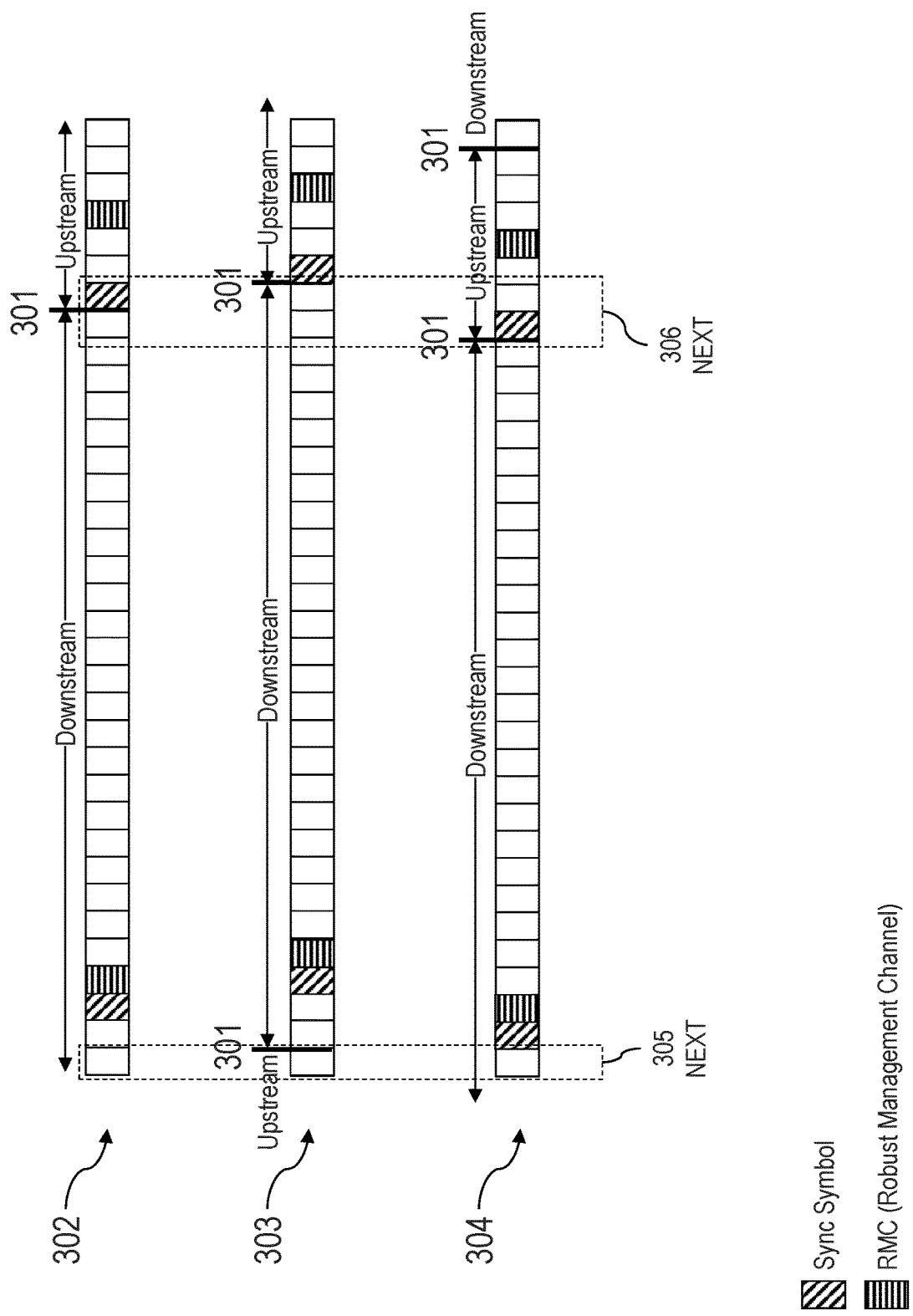
FIG. 3 shows a TDD frame comprising upstream and downstream portions, which are separated by a frame split, wherein the frames are not synchronized in time which results in inter DPU NEXT.

FIG. 3 shows upstream and downstream frame split boundaries 301 for TDD frames of DPUs 302 to 304. Each of the downstream TDD frame and each of the upstream TDD frame comprises a sync symbol and an RMC.

The TDD frames shown in FIG. 3 are not aligned (synchronized) across the DPUs 302 to 304. An area 305 shows that the downstream traffic of the DPUs 302 and 304 overlaps with the upstream traffic of the DPU 303 resulting in near-end crosstalk (NEXT). An area 306 shows another misalignment that results in NEXT between the signals of opposite transmission directions of the DPUs 302 to 304.

NEXT indicates that the strong transmitted signal by the nearby transmitters cross-talks into the attenuated received signal resulting in a disturbance that cannot be cancelled by vectoring relying on far-end crosstalk (FEXT) cancellation.

Figure 4:
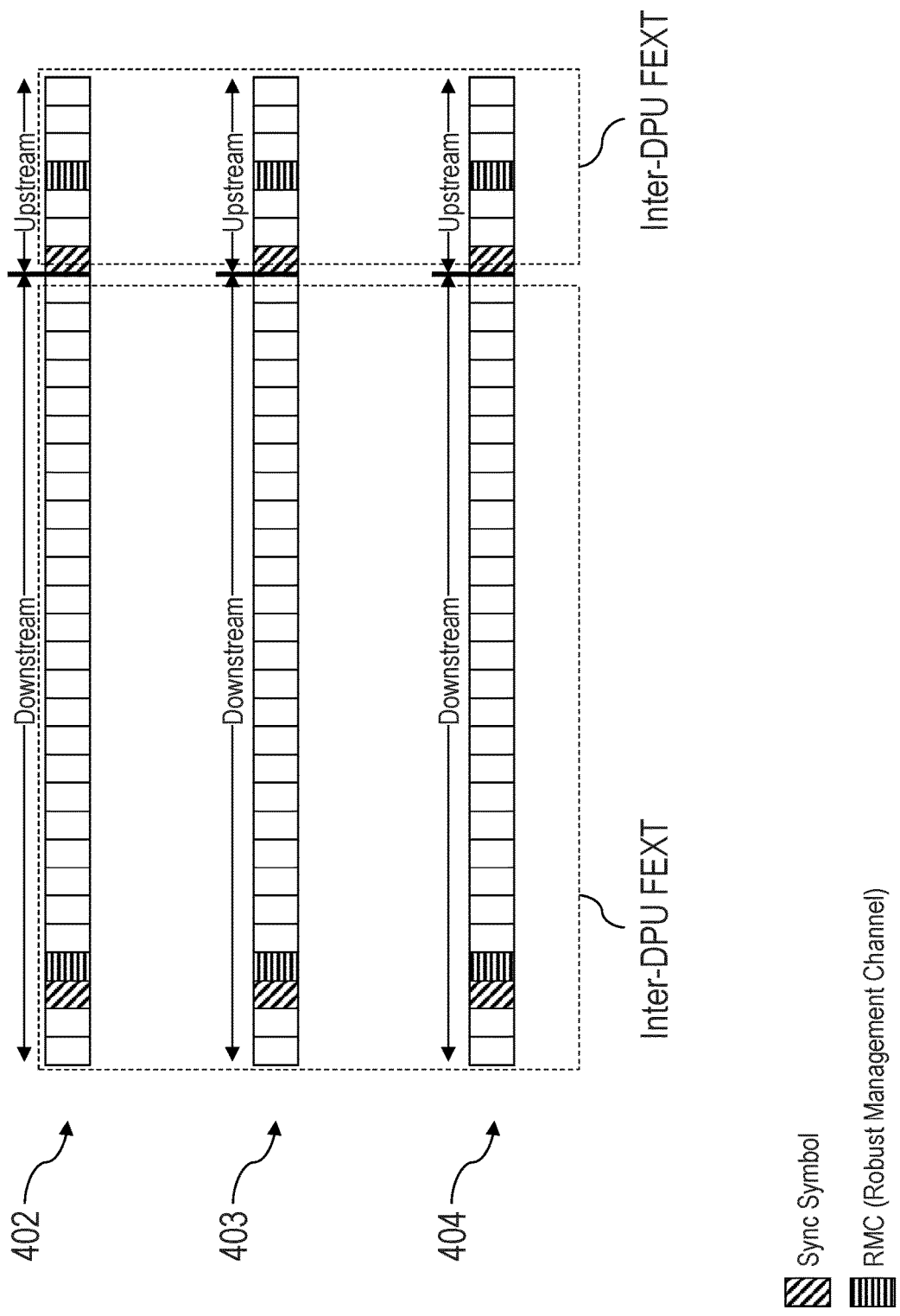
FIG. 4 shows inter DPU FEXT impairment with aligned TDD frames.

FIG. 4 shows inter DPU FEXT impairment with aligned TDD frames. Here, the TDD frames of DPUs 402 to 404 are synchronized thereby mitigating or avoiding NEXT. In case no information is exchanged between the independently vectored DPUs 402 to 404, inter DPU FEXT may occur and degrade the performance. This may even apply to some extent for separated cable binders, because high frequency components of the G.fast signal may impact an adjacent cable binder or an adjacent cable. Hence, any residual FEXT from lines that are not served/vectored by one DPU deteriorates performance.

There are several possibilities to coordinate multiple DPUs. Beneficially, the DPUs sharing a cable are synchronized to avoid (or reduce) NEXT (also referred to as inter DPU NEXT) as shown in FIG. 3. FEXT, however, can only be reduced or cancelled within each individual vectoring group of one particular DPU (intra DPU FEXT). Still, there may exist inter DPU FEXT among lines that are managed by different DPUs, i.e. different vectoring groups.

Figure 5:
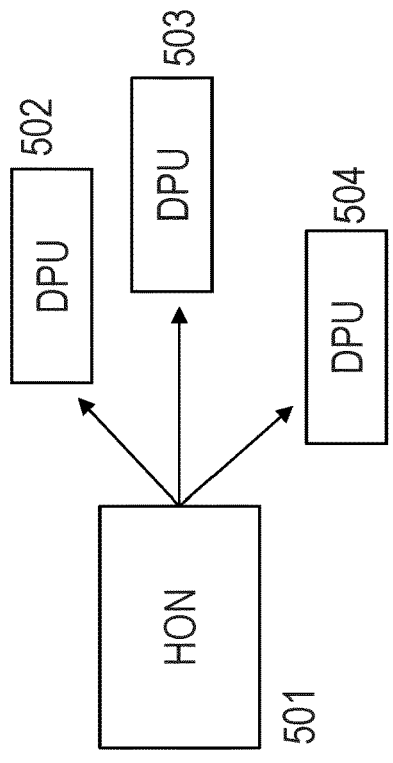
FIG. 5 shows an exemplary solution to achieve synchronization between DPUs via a central unit.

FIG. 5 shows an exemplary solution to achieve synchronization between DPUs 502 to 504 via a central unit, which in this example is a higher order node (HON) 501. Such synchronization may be realized via a backhaul data interface such as Synchronous Ethernet (SyncE) standard defined in ITU-T Rec. G.8261, G.8262, and G.8264 or ToD according to IEEE 1588v2, or NTR in xPON. Each DPU may then derive its symbol clock source and training state-machine based on this information.

This approach may be advantageous, because most HONs already have common clock source to feed individual DPUs. In such scenario, each DPU may only have to utilize the backhaul interface derived clock for its symbol and superframe generation.

Figure 6:
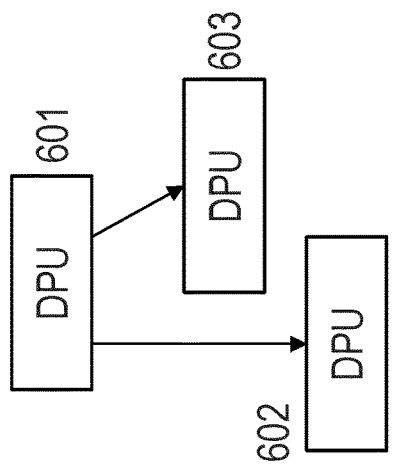
FIG. 6 shows an alternative clock synchronization approach with one DPU being assigned the role of a master node that supplies a dedicated clock signal towards the other DPUs.

FIG. 6 shows an alternative clock synchronization approach wherein one DPU 601 is assigned a role as a master node which supplies a dedicated clock signal to the DPUs 602, 603.

Figure 7:
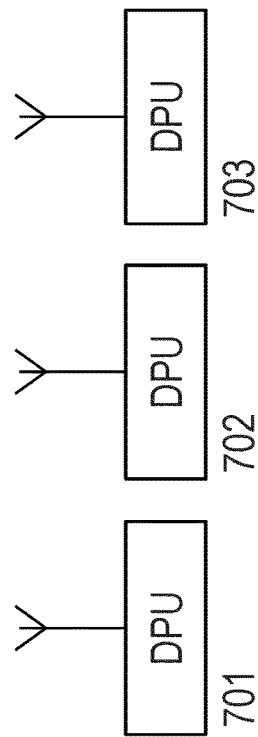
FIG. 7 shows another alternative for clock synchronization in which the DPUs are configured to receive a GPS signal utilizing a common clock source supplied by GPS satellites.

FIG. 7 shows yet another alternative approach for clock synchronization in which the DPUs 701 to 703 are configured to receive a GPS signal utilizing a common clock source supplied by GPS satellites. In such scenario, each DPU 701 to 703 may act like a micro-cell of a mobile network. A GPS receiver may be part of each of the DPUs 701 to 703 or it may be installed in the vicinity of the respective DPU 701 to 703. Each of the DPUs 701 to 703 is programmed to derive its clock source from the external reference clock provided via GPS signals.

Figure 8:
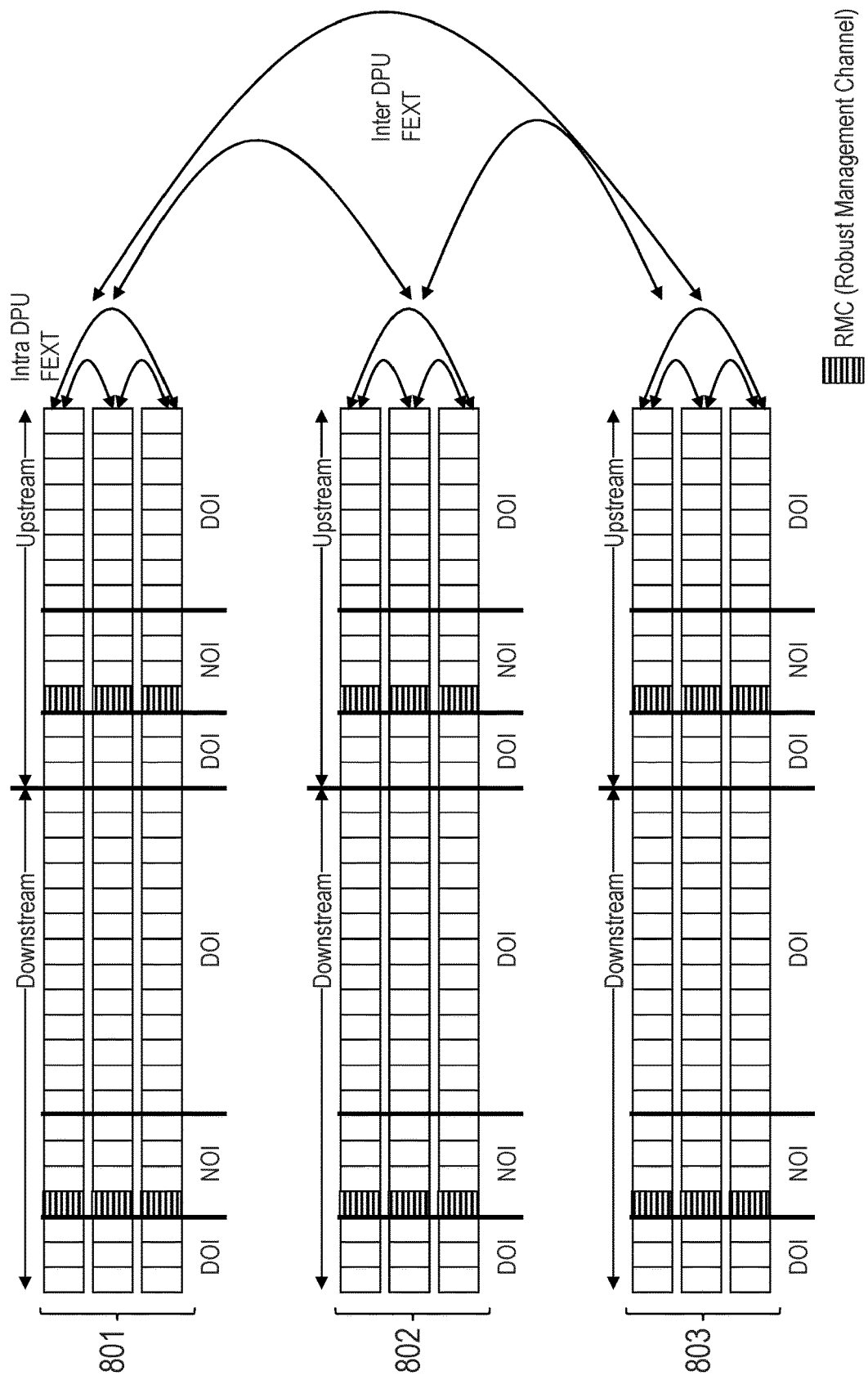
FIG. 8 shows a diagram visualizing three lines of upstream/downstream traffic for three DPUs illustrating the difference between intra DPU FEXT and inter DPU FEXT.

FIG. 8 shows a diagram visualizing three lines of upstream/downstream traffic for each DPU 801, 802 and 803. In this example, the DPUs are synchronized, i.e. the downstream and upstream time slots start and end at the same time. The downstream portion of the TDD frame comprises normal operation intervals (NOIs) and discontinuous operation intervals (DOIs). Also, the upstream portion of the TDD frame comprises normal operation intervals (NOIs) and discontinuous operation intervals (DOIs). In this example, the start and end of the NOIs and DOIs are synchronized within and across the DPUs 801 to 803.

Intra DPU FEXT occurs between the lines of a single DPU and can be reduced or cancelled by vectoring means of this particular DPU.

Inter DPU FEXT occurs between DPUs and cannot be reduced or cancelled as there is no vectoring across the DPUs 801 to 803. Un-cancelled crosstalk may lead to a severe degradation of the data rate.

Coordinated Dynamic Time Assignment (cDTA) has been introduced to G.fast as one of the options to adapt the frame configuration to the actual traffic demand within a single DPU or vectoring group.

Figure 9:
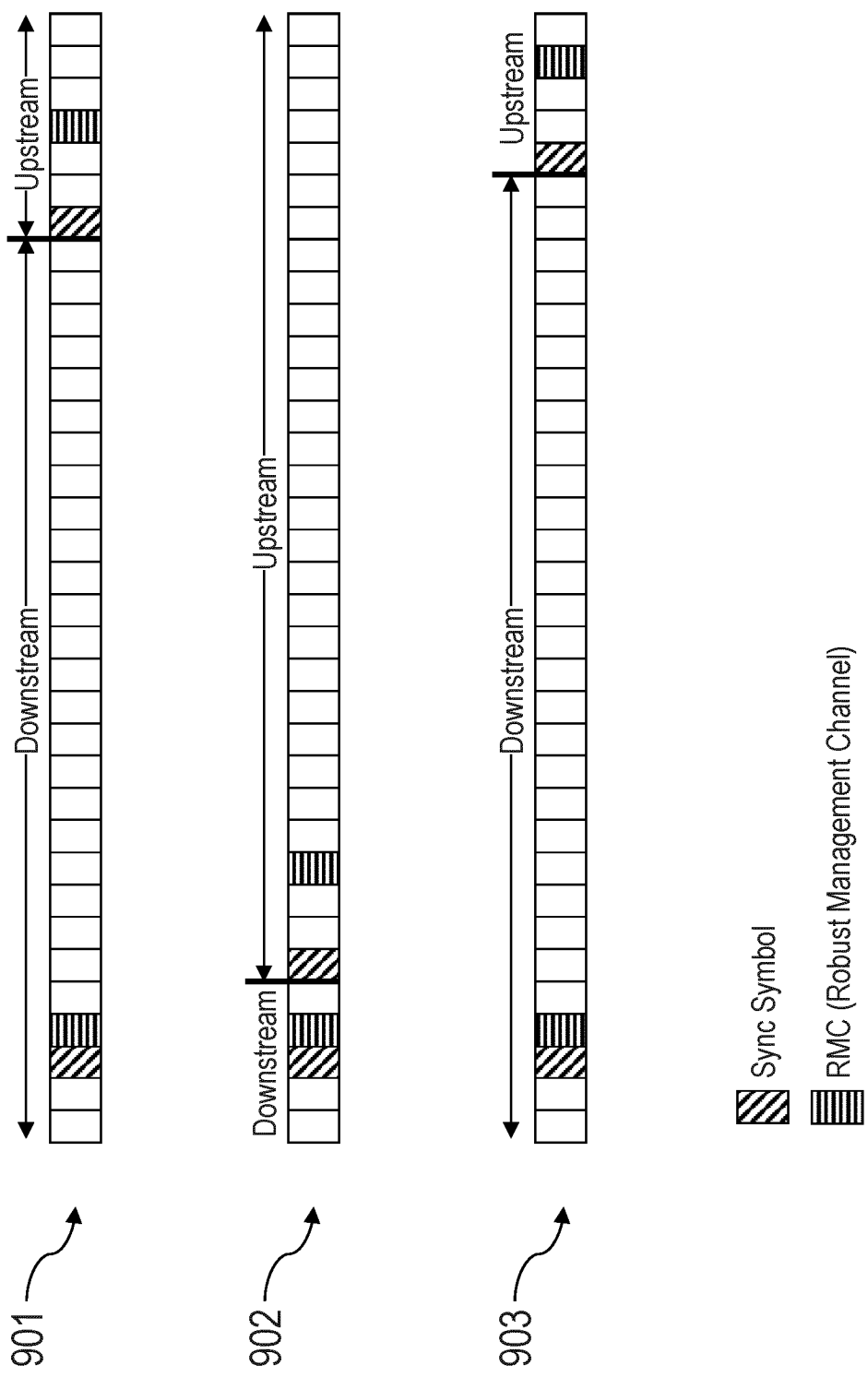
FIG. 9 shows exemplary TDD frame configurations with different split ratios regarding the number of upstream and downstream time slots utilizing cDTA.

FIG. 9 shows exemplary TDD frame configurations 901, 902 and 903 with different split ratios regarding the number of upstream and downstream time slots utilizing cDTA.

The configuration 901 shows an exemplary configuration of a split ratio, the configuration 902 shows an example utilizing a maximum number of upstream time slots and the configuration 903 shows an example utilizing a maximum number of downstream time slots.

The first upstream time slot comprising the sync symbol indicates the split between downstream and upstream time slots.

It is noted that the sync symbol is only sent in the TDD sync frame which is the first frame of a superframe (see also FIG. 2). In TDD frames other than the first frame of the superframe, normal data symbols are transmitted at the position of this sync symbol.

The offset of the RMC relative to the start of the downstream as well as the upstream part of the TDD frame may be set during initialization and may not change during showtime.

FIG. 9 shows examples which are compliant to ITU-T G.9701 (see Annex D and Annex X). The configuration 901 shows a typical default TDD frame configuration with $M_{ds}$=28 downstream symbol and $M_{us}$=7 upstream symbols. The configuration 902 shows a maximum number of DMT symbols are dedicated to the upstream ($M_{ds}$=5, $M_{us}$=30) and the configuration 903 dedicates most of the capacity to the downstream ($M_{ds}$=30, $M_{us}$=5). It is noted that the values are only examples and may change according to a use case and/or a different version of the Standard.

During showtime the TDD frame configuration may dynamically change based on the current demand between the two extremes shown in the configurations 902 and 903.

The downstream sync symbols and the RMC symbols may always be at the same positions while the absolute position of the corresponding upstream sync symbols and RMC symbols may vary depending on the number of upstream symbols.

The cDTA may apply to a single DPU where the TDD split point between upstream and downstream may change simultaneously among all lines managed by this particular DPU or vectoring group.

Examples described herein in particular relate to crosstalk avoidance for multiple DPUs (preferably synchronously) operating in cDTA mode.

Figure 10:
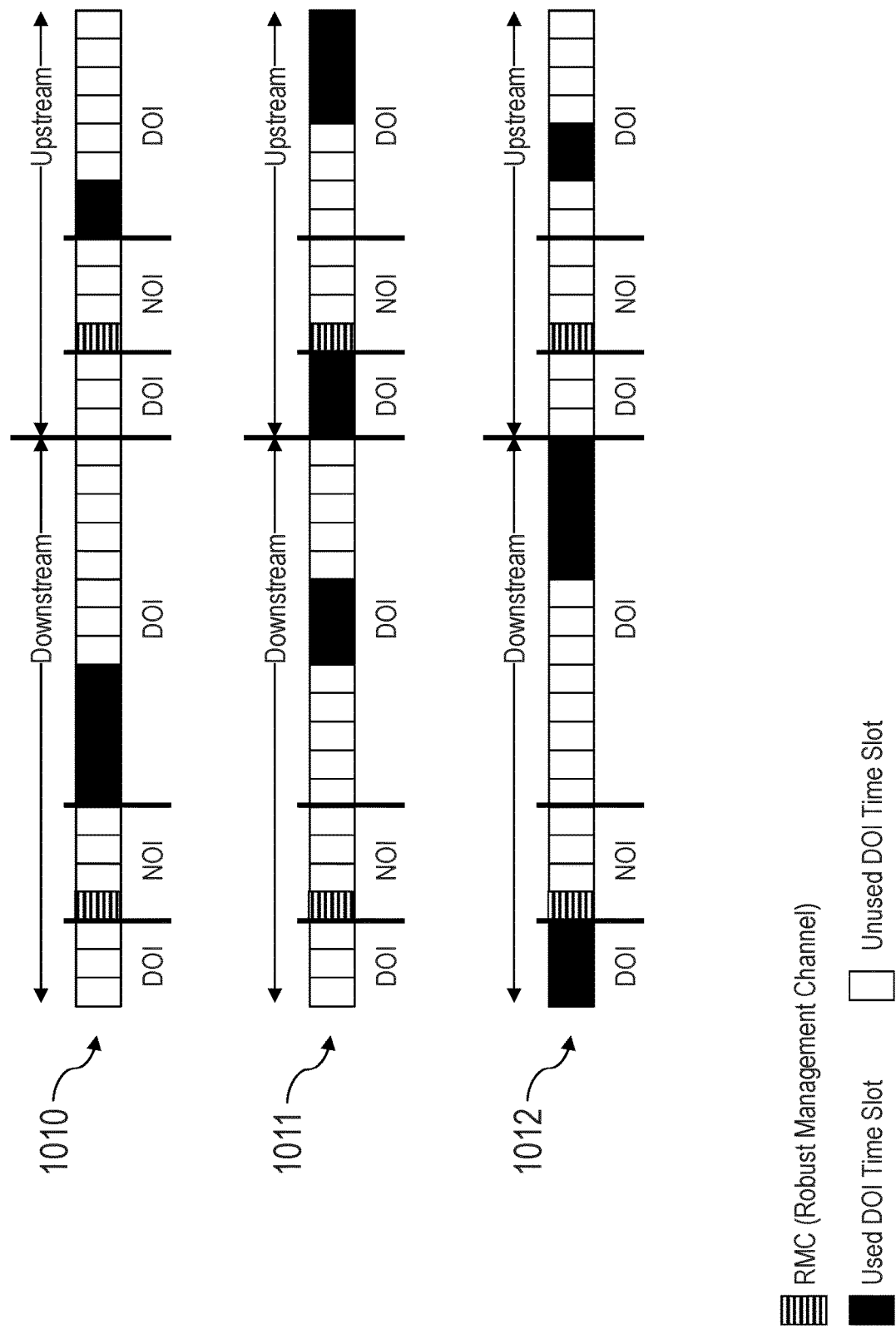
FIG. 10 shows an exemplary diagram visualizing the utilization of DOIs such that traffic is conveyed in a non-overlapping manner via several DPUs.

FIG. 10 shows an exemplary diagram visualizing time slots of three lines 1010, 1011 and 1012, wherein each line is managed by a different DPU. It is noted that each DPU may manage more than one line and each of the lines shown in FIG. 10 may thus be part of a vectoring group of the respective DPU.

For each of the lines 1010 to 1012 a TDD frame is shown comprising a downstream portion and an upstream portion. The TDD frames are synchronized across the DPUs as described above, i.e. the split between downstream and upstream is aligned.

Also, each of the frames comprises the same number of DOIs and NOIs, wherein the DOIs and NOIs of the different frames each starts and ends with the same time slot, i.e. for the TDD frames shown the intervals are arranged as follows:

time slots 1 to 3: DOI within the downstream portion;

time slots 4 to 7: NOI within the downstream portion;
time slots 8 to 20: DOI within the downstream portion;
time slots 21 to 23: DOI within the upstream portion;
time slots 24 to 27: NOI within the upstream portion; and
time slots 28 to 35: DOI within the upstream portion.

Hence, the upstream and downstream portion of the TDD frame each is divided into one NOI and one DOI. In contrast to the NOI, not all time slots of the DOI have to be used for transmitting symbols. The DOIs may be configured dynamically with only a given number of symbols at dedicated positions of the frame being used. This allows avoiding crosstalk between DPUs, in particular crosstalk that cannot be cancelled otherwise.

In FIG. 10, crosstalk between the DPUs is avoided by utilizing the DOIs of different DPUs in a non-overlapping manner as follows:

time slots 1 to 3: downstream traffic is conveyed via the line 1012;
time slots 8 to 12: downstream traffic is conveyed via the line 1010;
time slots 13 to 15: downstream traffic is conveyed via the line 1011;
time slots 16 to 20: downstream traffic is conveyed via the line 1012;
time slots 21 to 23: upstream traffic is conveyed via the line 1011;
time slots 28 and 29: upstream traffic is conveyed via the line 1010;
time slots 30 and 31: upstream traffic is conveyed via the line 1012; and
time slots 32 to 35: upstream traffic is conveyed via the line 1011.

Hence, the DPUs may use a different number of (upstream and/or downstream) time slots based on different frame configurations to meet individual traffic demands. Hence, during DOIs there is no traffic overlap between different DPUs and thus no (un-cancelled) crosstalk between traffic to and from these DPUs.

Hence, lines connected to one DPU can use the maximum peak rate during at least one DOI because crosstalk between DPUs is avoided. In an extreme case, one DPU may utilize the full DOI while the other DPUs are quiet during this part(s) of the TDD frame.

The time slots of the NOIs may always be utilized thereby producing crosstalk that cannot be cancelled or avoided between DPUs. However, the duration of the NOIs may be minimized in a TDD frame. The crosstalk that occurs during NOIs may be reduced by utilizing Dynamic Spectrum Management (DSM) to improve or optimize the PSD. Hence, crosstalk impairment due to NOIs is minimized while enabling a stable transmission or improving the transmission.

For example, a DSM approach may utilize disjointed tones among different DPUs (vectoring group). RMC tones may be selected so that there is no overlap among each vectoring group. The stability of the RMC may be beneficial for the management of multiple G.fast DPUs in the system and the number of RMC tones may be limited to avoid capacity loss. Alternatively, the same low frequency RMC tones could be selected for all DPUs with a reduced bit-loading. Crosstalk at lower frequencies is usually weak and a lower bit-loading will make the transmission more robust. By doing so the transmission of the RMC will be robust even with moderate crosstalk between the lines connected to different DPUs.

With an increase or decrease in traffic demand for either upstream or downstream, cDTA can be utilized to shift the split point between upstream and downstream and to increase or decrease the DOI(s) for the respective direction. Increasing or decreasing the DOI(s) refers in particular to increasing or decreasing the number of time slots available for at least one DOI.

Figure 11:
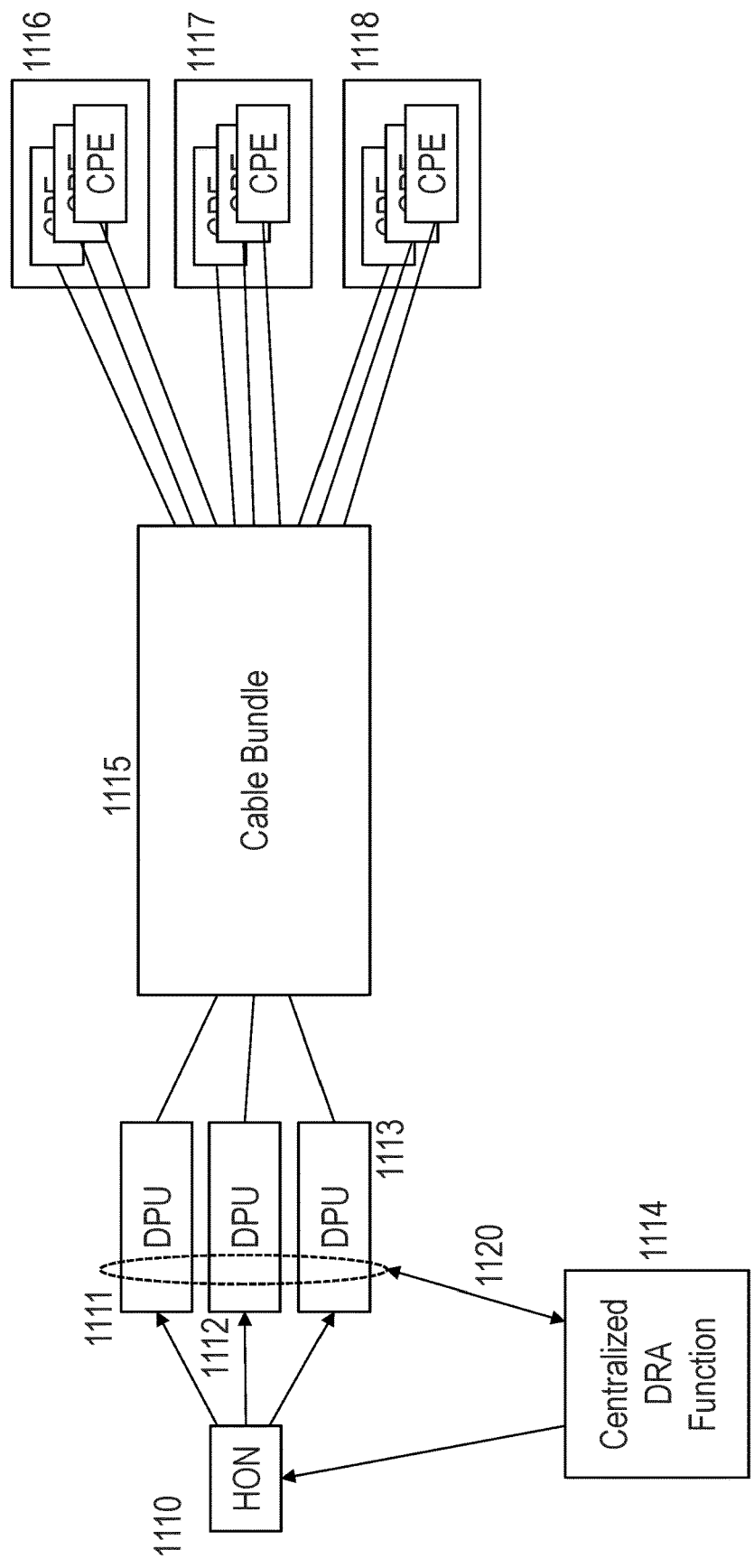
FIG. 11 shows an exemplary diagram comprising several G.fast DPUs that share a common cable bundle to get connected to the terminals, wherein the DPUs are controlled by a centralized DRA function.

FIG. 11 shows an exemplary diagram comprising several G.fast DPUs 1111 to 1113 sharing a cable bundle 1115 towards several vectoring groups 1116 to 1118, wherein each vectoring group 1116 to 1118 is controlled by one of the DPUs 1111 to 1113. Each vectoring group 1116 to 1118 comprises several CPEs.

A centralized Dynamic Resource Allocation (DRA) function 1114 is provided, which can be implemented in a HON 1110 or a cloud (a connection of processing resources that are connected via a network, wherein such network may comprise the Internet) to monitor user traffic demand to optimize the frame TDD split location as well as the number of DOI time slots for DOI allocations of the DPUs 1111 to 1113. A timing synchronization for the DPUs 1111 to 1113 can be supplied by the HON 1110 as described with regard to FIG. 5 above.

The centralized DRA function 1114 communicates with the DPUs 1111 to 1113 either directly or indirectly. Such communication is indicated by an arrow 1120 to a dashed ellipsis. This is explained in more detail with regard to FIG. 12 below.

Figure 12:
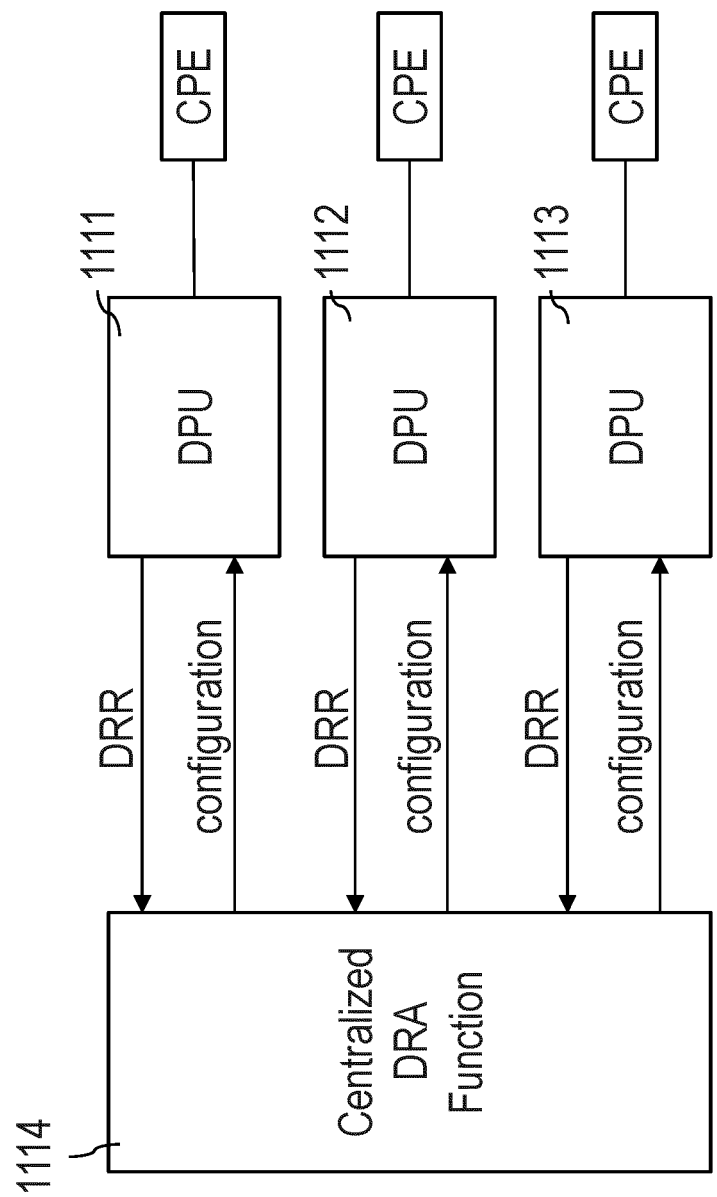
FIG. 12 shows the centralized DRA function, which is capable of communicating with each of its connected DPUs.

FIG. 12 shows the centralized DRA function 1114 capable of communicating with each of the DPUs 1111 to 1113. Each of the DPUs may be connected to at least one CPE (which is schematically indicated in FIG. 12).

For cDTA operation purposes, the centralized DRA function 1114 receives traffic-related information from each of the DPUs 1111 to 1113. Such traffic-related information may be conveyed via dynamic resource reports (DRR) for each line and each direction.

Based on this information and the knowledge of the current TDD frame split of the actual group configuration, the centralized DRA function 1114 may decide to change the TDD frame configuration and instruct the DPUs of all active lines to change the number of symbol periods (i.e. time slots) to be allocated in each direction synchronously.

The centralized DRA function 1114 may be part of a master DPU node, at HON or it may reside in a cloud of or beyond the access network.

Each DPU may contain M transceivers for a total of N×M lines, where N is the number of DPUs.

For further details regarding the data flow of the DPU reference is made to ITU-T G.9701, Annex D.

The information conveyed from each of the DPUs 1111 to 1113 to the centralized DRA function 1114 may comprise at least one of the following:
  an upstream DRR (DRRus);
  a downstream DRR (DRRds);
  a time information of the DPU;
  a frequency information of the DPU.

The information conveyed from the centralized DRA function 1114 towards each of the DPUs 1111 to 1113 may be regarded as configuration, which comprises at least one of the following:
  number of upstream symbols $M_{us}$;
  number of downstream symbols $M_{ds}$;
  time slots used for NOI in upstream;
  time slots used for DOI in upstream;
  time slots used for NOI in downstream;
  time slots used for DOI in downstream.

In order to maximize a peak rate for a particular line while other lines are either in a low load or base load state (e.g.

VoIP and IPTV), a fixed number of upstream DOI and downstream DOI slots can be allocated at the beginning.

Figure 13:
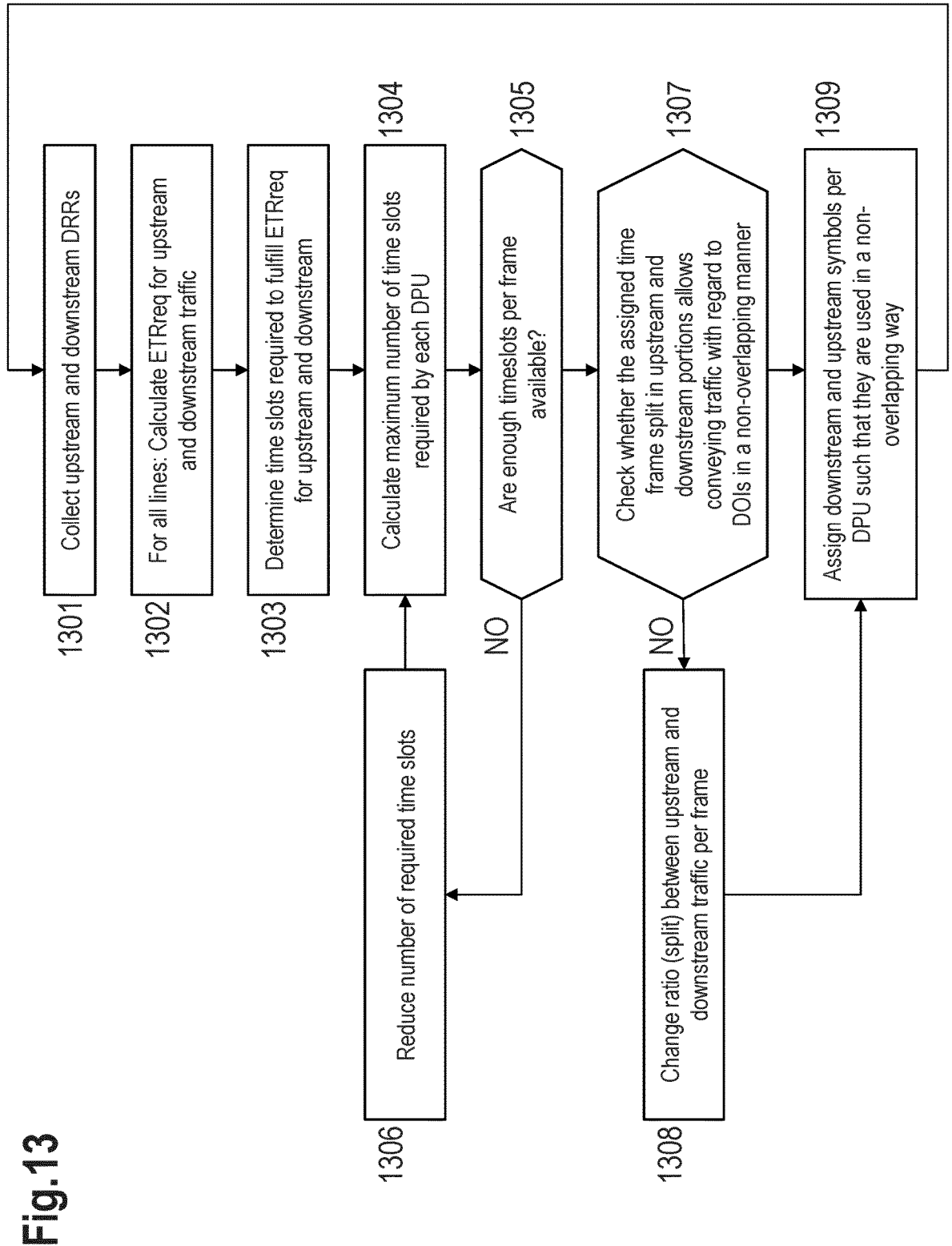
FIG. 13 shows flow chart comprising exemplary steps to be conducted by the centralized DRA function.

FIG. 13 shows an exemplary flow chart comprising the following steps to be performed by the centralized DRA function:

Step 1301: Upstream DRRs and the downstream DRRs are collected for all lines.

Step 1302: Calculate for all lines a requested expected throughput rate ETRreq for upstream traffic as well as downstream traffic.

Step 1303: Determine the time slots required to fulfill the ETRreq for upstream as well as downstream traffic.

Step 1304: Calculate the maximum number of time slots required by each DPU for upstream as well as downstream traffic.

Step 1305: Determine whether the maximum number of time slots required by all DPUs for downstream traffic and for upstream traffic is smaller or equal to the number of available time slots per frame.

Step 1306: If step 1305 reveals that the available number of time slots does not suffice, the number of required time slots is reduced (with regard to upstream traffic and/or downstream traffic), e.g., according to a prioritization scheme and it is continued with step 1304.

Step 1307: If step 1305 reveals that the available number of time slots is sufficient: It is checked whether the assigned time frame split in upstream and downstream portions allows conveying upstream and downstream traffic with regard to DOIs in a non-overlapping manner.

Step 1308: If the requirement of step 1307 cannot be met: Split the TDD frame in an upstream portion and a downstream portion such that traffic within the DOIs can be conveyed in a non-overlapping manner. Instruct the DPUs to synchronously adjust the upstream/downstream ratio of the TDD frame.

Step 1309: Subsequent to step 1307 (if answered in the affirmative) and to step 1308: Assign the downstream and upstream symbols per DPU such that they are used in a non-overlapping way. Proceed to step 1301.

The cDTA operation may be driven by the measurements from upstream DRRs and downstream DRRs thereby enabling the centralized DRA function to determine a current resource utilization for each line and each direction.

If all traffic demand can be met by the allocations of the DOI time slots, the number of downstream time slots $M_{ds}$ and upstream time slots $M_{up}$ is not changed.

If the traffic demand reported by DRRs indicated a higher demand in upstream or downstream direction, the upstream-downstream ratio can be shifted to meet this demand. If the overall demand cannot be met, a delay may be introduced, wherein traffic of higher priority (e.g., traffic with real-time requirement) may be preferred.

When the DOI assignment and $M_{ds}$ changes, the ETR for that DPU and that direction may indicate additional capacity gained from the DRA adjustment. The network operator may specify a required or desirable base load for each class of subscriber. For example, the class may have an impact on the base load.

In addition to crosstalk avoidance using DOI as described in the previous section, an alternative method is to allow residual inter DPU FEXT to be minimized by an external cloud based Dynamic Spectral Management (DSM) controller where high traffic demands lines may scale the more tones allocated for non-overlapped PSD while low traffic demand lines may only use low frequency tone (presumably low crosstalk) for overlapped PSD to stay with a minimum required bit rate (e.g. <80 Mbps base load downstream and 10 Mbps upstream base load) while allowing the high frequency spectrum to be utilized for peak traffic demand lines.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

LIST OF ABBREVIATIONS cDTA Coordinated Dynamic Time Assignment
CPE Customer Premises Equipment
DOI Discontinuous Operation Interval
DPU Distribution Point Unit
DRA Dynamic Resource Allocation
DRR Dynamic Resource Report
DRRds DRR downstream
DRRus DRR upstream
DSL Digital Subscriber Line
DSM Dynamic Spectrum Management
ETR Expected Throughput Rate
FAST Fast Access To Subscriber Terminals
FTU-O FAST Transceiver Unit-Office
FTU-R FAST Transceiver Unit-Remote
FEXT Far-End Crosstalk
GPS Global Positioning System
HON Higher Order Node
IP Internet Protocol
IPTV IP Television
LU Living Unit
$M_{ds}$ number of downstream symbols
MDU Multi-Dwelling-Unit
$M_{us}$ number of upstream symbols
NDR Net Data Rage
NEXT Near-End Crosstalk
NOI Normal Operation Interval
PON Passive Optical Network
PSD Power Spectral Density
RMC Robust Management Channel
SS Sync(hronization) Symbol
TDD Time Division Duplex
ToD Time-of-Day
VoIP Voice over IP
xPON x-variant of PON, e.g., GPON, BPON, etc.

The invention claimed is:

1. A dynamic resource allocation entity comprising:
a memory; and
a digital processing device, wherein the dynamic resource allocation entity is arranged to adjust a resource allocation for at least two Distribution Point Units (DPUs), and wherein a ratio between at least one normal operation interval (NOI) and at least one discontinuous operation interval (DOI) per upstream and/or downstream is adjusted within at least one time division duplex (TDD) frame.

2. The dynamic resource allocation entity according to claim 1 being arranged externally to the at least two DPUs, in particular in a higher order node and/or a cloud.

3. The dynamic resource allocation entity according to claim 1, wherein the resource allocation for the at least two DPUs comprises at least one of the following:
   an upstream resource allocation within at least one DOI for each of the DPUs; and
   a downstream resource allocation within at least one DOI for each of the DPUs.

4. The dynamic resource allocation entity according to claim 1, wherein the resource allocation for the at least two DPUs is adjusted such that an overlap of time slots used by different DPUs in a time domain for conveying traffic is reduced or minimized.

5. The dynamic resource allocation entity according to claim 4, wherein each of the DPUs is assigned a different non-overlapping portion of at least one DOI.

6. The dynamic resource allocation entity according to claim 1, wherein a duration of the at least one NOI in the TDD frame is reduced or minimized.

7. The dynamic resource allocation entity according to claim 1, wherein a power spectral density of the at least one NOI is reduced by utilizing dynamic spectrum management (DSM).

8. The dynamic resource allocation entity according to claim 1, wherein the ratio is set by the dynamic resource allocation entity for each DPU.

9. The dynamic resource allocation entity according to claim 1, wherein a timing of the DPUs is synchronized via a higher order node.

10. The dynamic resource allocation entity according to claim 1, wherein a timing of the DPUs is synchronized via a master node, wherein the master node is one of the DPUs.

11. The dynamic resource allocation entity according to claim 1, wherein a timing of the DPUs is synchronized via global positioning system signal.

12. The dynamic resource allocation entity according to claim 1, which is arranged to synchronize a timing of the DPUs.

13. A system comprising the dynamic resource allocation entity according to claim 1, further comprising at least one DPU, wherein the at least one DPU is connected via a at least one cable bundle to several terminals.

14. A method for operating at least two Distribution Point Units (DPUs), the method comprising:
   adjusting a resource allocation for the at least two DPUs by a centralized dynamic resource allocation entity, wherein a ratio between at least one normal operation interval (NOI) and at least one discontinuous operating interval (DOI) per upstream and/or downstream is adjusted within at least one time division duplex (TDD) frame.

15. The method according to claim 14, wherein the resource allocation for the at least two DPUs comprises at least one of the following:
   an upstream resource allocation within at least one DOI for each of the DPUs; and
   a downstream resource allocation within at least one DOI for each of the DPUs.

16. The method according to claim 14, wherein the resource allocation for the at least two DPUs is adjusted such that an overlap of time slots used by different DPUs in a time domain for conveying traffic is reduced or minimized.

17. A method for operating at least two Distribution Point Units (DPUs), the method comprising:
   adjusting a resource allocation for the at least two DPUs by a centralized dynamic resource allocation entity, wherein each of the DPUs is assigned a different non-overlapping portion of at least one discontinuous operating interval (DOI).

18. The method according to claim 17, wherein traffic is prioritized before being conveyed across the different non-overlapping portions of the at least one DOI.

19. The method according to claim 14, wherein a timing of the DPUs is synchronized via at least one of the following:
   a higher order node;
   the centralized dynamic resource allocation entity;
   one of the DPUs.

* * * * *